J. E. GOHN, Jr.
CLUTCH MECHANISM.
APPLICATION FILED MAY 17, 1911.
1,011,426.
Patented Dec. 12, 1911.
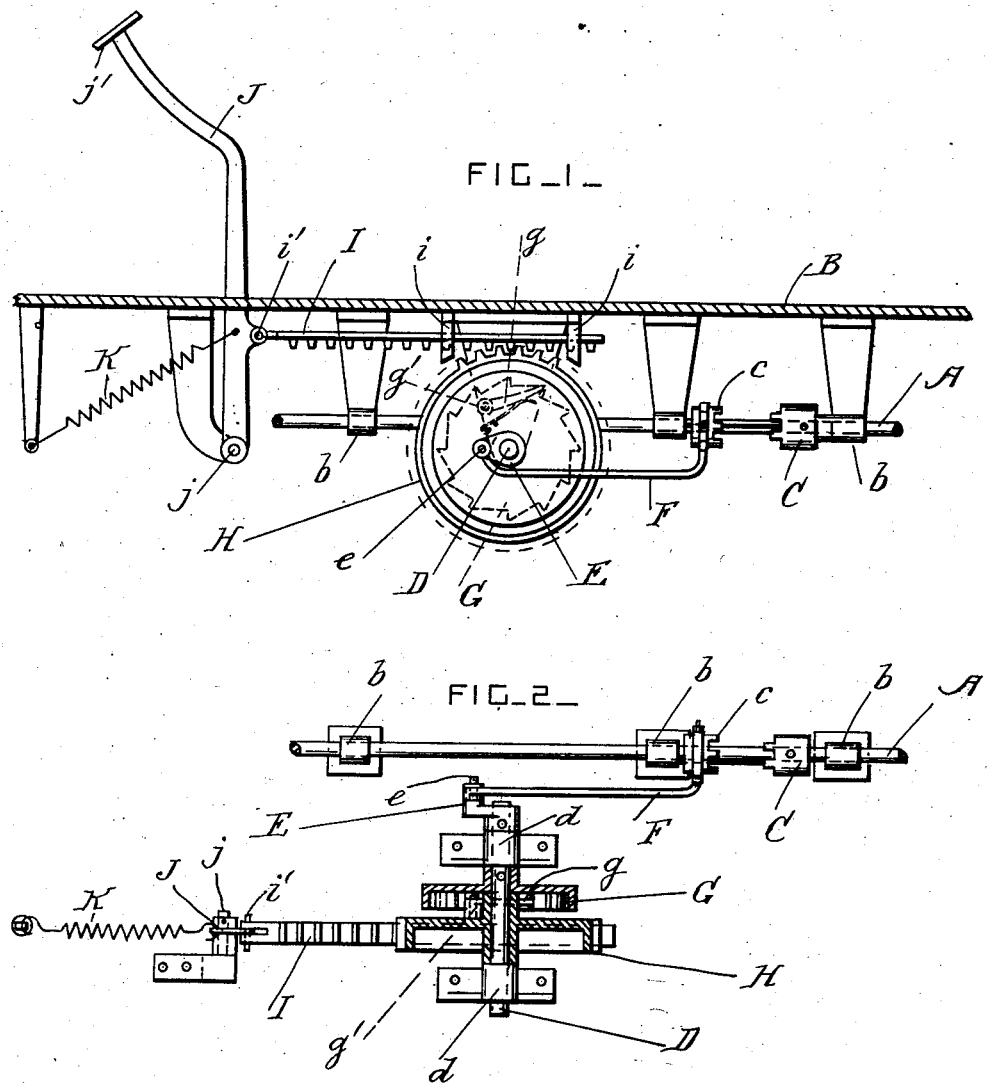

UNITED STATES PATENT OFFICE.

JOHN E. GOHN, JR., OF WRIGHTSVILLE, PENNSYLVANIA.

CLUTCH MECHANISM.

1,011,426. Specification of Letters Patent. Patented Dec. 12, 1911.

Application filed May 17, 1911. Serial No. 627,797.

*To all whom it may concern:*

Be it known that I, JOHN E. GOHN, Jr., a citizen of the United States, residing at Wrightsville, in the county of York and State of Pennsylvania, have invented certain new and useful Improvements in Clutch Mechanism; and I do hereby declare the following to be a full, clear, and exact description of the invention, such as will enable others skilled in the art to which it appertains to make and use the same.

This invention relates to mechanism for operating the clutch of an automobile or other machine; and it consists in the novel construction and combination of the parts hereinafter fully described and claimed.

In the drawings, Figure 1 is a side view of a clutch provided with operating mechanism according to this invention. Fig. 2 is a plan view of the same, from below, and partially in section.

A is a driving shaft which revolves in suitable bearings *b* carried by a support or frame B; and C is a clutch mounted on the shaft A, and provided with a slidable clutch member *c*. These parts are of any approved construction, and they may be portions of an automobile or other machine.

D is a shaft journaled in bearings *d* on the frame, and arranged crosswise of the shaft A; and E is a crank secured on one end of the shaft D and provided with a crank-pin *e*.

F is a rod operatively connected with the slidable clutch member *c* at one end, and having its other end pivoted on the crank-pin *e*.

G is a ratchet toothed wheel secured to the shaft D; and H is a toothed wheel mounted loosely on the shaft D adjacent to the ratchet toothed wheel G.

A spring-pressed pawl *g* is pivoted on a pin *g'* which projects from the wheel H, and this pawl engages with the teeth of the ratchet wheel G.

I is a toothed rack which is slidable in guides *i* on the frame, and which gears into the toothed wheel H.

J is an operating lever pivoted at one end to the frame by a pin *j*, and having the rack pivoted to its middle part by a pin *i'*. In an automobile this lever J is preferably arranged in a substantially vertical position, and it is provided with a foot-plate *j'* at its upper end.

K is a retracting spring arranged between the lever and the frame, which moves the lever and rack in one direction.

When the parts are in the positions shown in the drawings, the clutch members are out of engagement with each other. When the foot lever is pressed forward for a full stroke the rack revolves the toothed wheel, and the pawl revolves the ratchet wheel, so that the crank is revolved half a revolution. This places the clutch members in engagement with each other, and the spring retracts the lever upon the pressure of the foot being removed, without affecting the position of the crank or disengaging the clutch members. When the foot lever is pressed forward a second time the ratchet toothed wheel and the crank are again revolved for half a revolution, and the slidable clutch member is retracted to its original position. The clutch is in this manner controlled by a single foot lever, the consecutive strokes of which move its slidable member into and out of engagement alternately with the clutch member secured on the shaft, and in this manner the operator has both hands left free for other purposes.

What I claim is:

1. The combination, with a clutch having a slidable clutch member, of a shaft provided with a crank, a connection between the said crank and clutch member, a ratchet toothed wheel secured on the said shaft, a toothed wheel mounted on the said shaft, a pawl pivoted to the toothed wheel and engaging with the said ratchet toothed wheel, a rack engaging with the said toothed wheel, and means for sliding the said rack back and forth.

2. The combination, with a clutch having a slidable clutch member, of a shaft provided with a crank, a connection between the said crank and clutch member, a ratchet toothed wheel secured on the said shaft, a toothed wheel mounted on the said shaft, a pawl pivoted to the toothed wheel and engaging with the said ratchet toothed wheel, a rack engaging with the said toothed wheel and arranged above it, and a spring-operated foot-lever pivoted at its lower end and arranged substantially vertical and having the said rack connected to its middle part.

In testimony whereof I have affixed my signature in the presence of two witnesses.

JOHN E. GOHN, Jr.

Witnesses:
CHARLES C. RITZ,
H. A. MAY.

Copies of this patent may be obtained for five cents each, by addressing the "Commissioner of Patents, Washington, D. C."